United States Patent [19]

Duvernay et al.

[11] Patent Number: 5,695,103
[45] Date of Patent: Dec. 9, 1997

[54] BIKE CARRIER

[75] Inventors: Mark E. Duvernay, Elkhart; Richard McCoy, Granger, both of Ind.

[73] Assignee: Reese Products, Inc., Elkhart, Ind.

[21] Appl. No.: 710,610

[22] Filed: Sep. 20, 1996

[51] Int. Cl.⁶ .................. B60R 9/06; B60R 9/10
[52] U.S. Cl. ............... 224/532; 224/527; 224/533; 224/537; 224/924; 224/502; 224/504; 224/511; 224/521
[58] Field of Search ................. 224/527, 532, 224/533, 537, 502, 924, 488, 495, 504, 511, 512, 519, 521, 548, 553, 536; 16/225; D12/407, 408; 280/769

[56] References Cited

U.S. PATENT DOCUMENTS

| | | |
|---|---|---|
| 4,380,344 | 4/1983 | Abbott . |
| 4,461,410 | 7/1984 | Tartaglia . |
| 4,938,399 | 7/1990 | Hull et al. ............... 224/521 |
| 5,004,133 | 4/1991 | Wyers . |
| 5,038,983 | 8/1991 | Tomososki ............... 280/769 |
| 5,094,373 | 3/1992 | Lovci . |
| 5,106,002 | 4/1992 | Smith et al. ............... 224/521 |
| 5,108,018 | 4/1992 | Spinka . |
| 5,190,195 | 3/1993 | Fullhart et al. . |
| 5,215,234 | 6/1993 | Pasley ............... 224/527 |
| 5,219,105 | 6/1993 | Kravitz . |
| 5,303,857 | 4/1994 | Hewson ............... 224/282 |
| 5,330,084 | 7/1994 | Peters . |
| 5,372,287 | 12/1994 | Deguevara . |
| 5,439,151 | 8/1995 | Clayton ............... 280/769 |
| 5,443,189 | 8/1995 | Hirschfeld ............... 224/532 |
| 5,460,304 | 10/1995 | Porter et al. ............... 224/532 |
| 5,489,110 | 2/1996 | Van Dusen ............... 280/769 |
| 5,529,231 | 6/1996 | Burgess ............... 224/536 |

Primary Examiner—Henry J. Recla
Assistant Examiner—Charles R. Eloshway
Attorney, Agent, or Firm—King & Schickli

[57] ABSTRACT

A vehicle mountable carrier includes a body having an article holder and a mounting tube for both securing the body to a vehicle and receiving a hitch bar. Preferably, the article holder includes a storage compartment and cooperating lid. The storage compartment may also include a cradle for receiving a frame of at least one bicycle. Specifically, a support channel may be provided bridging opposing walls of the storage compartment and cooperating frame receiving notches may be provided in the lid.

8 Claims, 4 Drawing Sheets

5,695,103

BIKE CARRIER

TECHNICAL FIELD

The present invention relates generally to a carrier that may be detachably mounted to a vehicle such as a passenger or recreational vehicle via a standard trailer hitch such as a square tube hitch receiver. More particularly, the present invention relates to a vehicle mountable bicycle carrier.

BACKGROUND OF THE INVENTION

Bicycle racks for attachment to passenger vehicle bumpers and trailer hitches are well known in the art. An example of one such bicycle rack is disclosed in U.S. Pat. No. 5,190,195 to Fullhart et al. That bicycle rack is adapted to be detachably mounted to a passenger vehicle via a standard trailer hitch. The bicycle rack has a vertical support that is pivotally connected at one end to a base assembly which is adapted for receipt in a hitch receiver. The other end carries a cross bar assembly with a removably mounted clamp arm for securing a pair of bicycles. While the bicycle rack disclosed in the Fullhart et al. patent is fully functional and convenient to use, it does suffer from several limitations. First, it does not include any compartment that may be utilized to hold riding paraphernalia such as hats, gloves and/or goggles or even tools such as screw drivers and wrenches. Second, the bicycle rack is only capable of holding up to two bicycles and is not expandable to hold more. Third, the bicycle rack occupies the hitch receiver of the vehicle thereby preventing connection of a trailer or another equipment to that receiver when the bicycle rack is secure in position. A need is therefore identified for a bicycle rack as fully functional as that disclosed in the Fullhart et al. patent while fully addressing and overcoming each of these limitations.

SUMMARY OF THE INVENTION

Accordingly, it is a primary object of the present invention to provide a vehicle mountable carrier, preferably in the form of a bicycle rack, overcoming the above-described limitations and disadvantages of the prior art.

Another object of the present invention is to provide a multiple function carrier that may be mounted to a vehicle by means of a standard trailer hitch such as a square tube hitch receiver wherein the carrier includes an enclosed storage compartment for holding tools, gloves, hats, glasses and other accessories and an integral cradle for holding a bicycle.

Still another object of the present invention is to provide a vehicle mountable bicycle rack including an enclosed storage compartment and a receiver capable of receiving another bicycle rack or a hitch bar for towing a light weight trailer.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a vehicle mountable carrier comprises a body including an article holder, a mount for securing the body to the vehicle and a receiver for receiving a hitch bar.

More particularly describing the invention, the body includes a post that is preferably, pivotally connected to a mounting tube that advantageously forms both the means by which the body is mounted to the vehicle and the means for receiving a hitch bar. Specifically, the mounting tube has a first, proximal end that is sized to plug into a vehicle hitch such as a square tube hitch receiver. The second or distal end forms a hitch receiver adapted to receive a hitch bar. Such a hitch bar may carry a hitch ball for towing a trailer, a second bike rack or any other hitch mountable accessory known to those skilled in the art.

Accordingly, it should be appreciated that the vehicle mountable carrier of the present invention is a highly versatile product that allows an individual to customize towing accessories to meet ones needs in a manner heretofore unknown in the art. In accordance with additional aspects of the present invention, the mount of the carrier further comprises cooperating, aligned securing apertures in sidewalls of the mounting tube as well as a connecting pin operatively received in the securing apertures and a pin clip for retaining the connecting pin in the securing apertures. More particularly, the securing apertures are aligned with like apertures in the hitch receiver on the vehicle. The connecting pin is then threaded through the aligned apertures and then the pin clip is used to secure the vehicle mountable carrier to the hitch receiver carried by the vehicle. Of course, multiple rows of cooperating aligned securing apertures may be provided in the mounting tube to allow one to adjust the length that the carrier projects from the vehicle hitch receiver.

Still further, the receiver includes cooperating aligned mounting apertures in side walls adjacent the distal end of the mounting tube. Additionally, the receiver includes a second connecting pin that is operatively received in the mounting apertures and a second pin clip for retaining a second connecting pin in the mounting apertures. Thus, a hitch bar may be inserted into the distal end of the mounting tube and secured in position by aligning the mounting aperture in a hitch bar with the mounting apertures in the mounting tube. The second connecting pin is then inserted through the apertures and the pin clip is utilized to secure the connecting pin in position. Accordingly, it should be readily appreciated how easily the carrier may be mounted to the vehicle and an additional hitch bar with hitch ball or other accessory may be mounted to the carrier.

In accordance with yet another aspect of the present invention, the article holder mounted to the upper end of the post comprises a storage compartment and cooperating lid. Preferably, the storage compartment and lid are interconnected by means of a living hinge. Advantageously, the storage compartment forms an enclosure that may be utilized to hold various tools, clothing and other articles or equipment in a protected and lockable enclosure.

Further, the article holder may include at least one and still more preferably three cradles, each capable of cradling the frame of a bicycle. More particularly, each cradle includes a bicycle frame support channel formed in opposing sidewalls of the storage compartment and cooperating aligned frame receiving notches formed in the lid. Thus, when the storage compartment is opened, the top tube of a bicycle frame may be placed in the support channels so that the top tube bridges across the storage compartment. The cooperating lid is then closed, the notches in the lid providing the clearance necessary to receive the top tube of the bicycle frame. With the lid closed and locked the bicycle frame is captured and securely held in position on the carrier. A foam rubber pad or other resilient material may line the underside of the lid. Such a pad functions to dampen any vibration between the bicycle frame and the carrier during towing.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
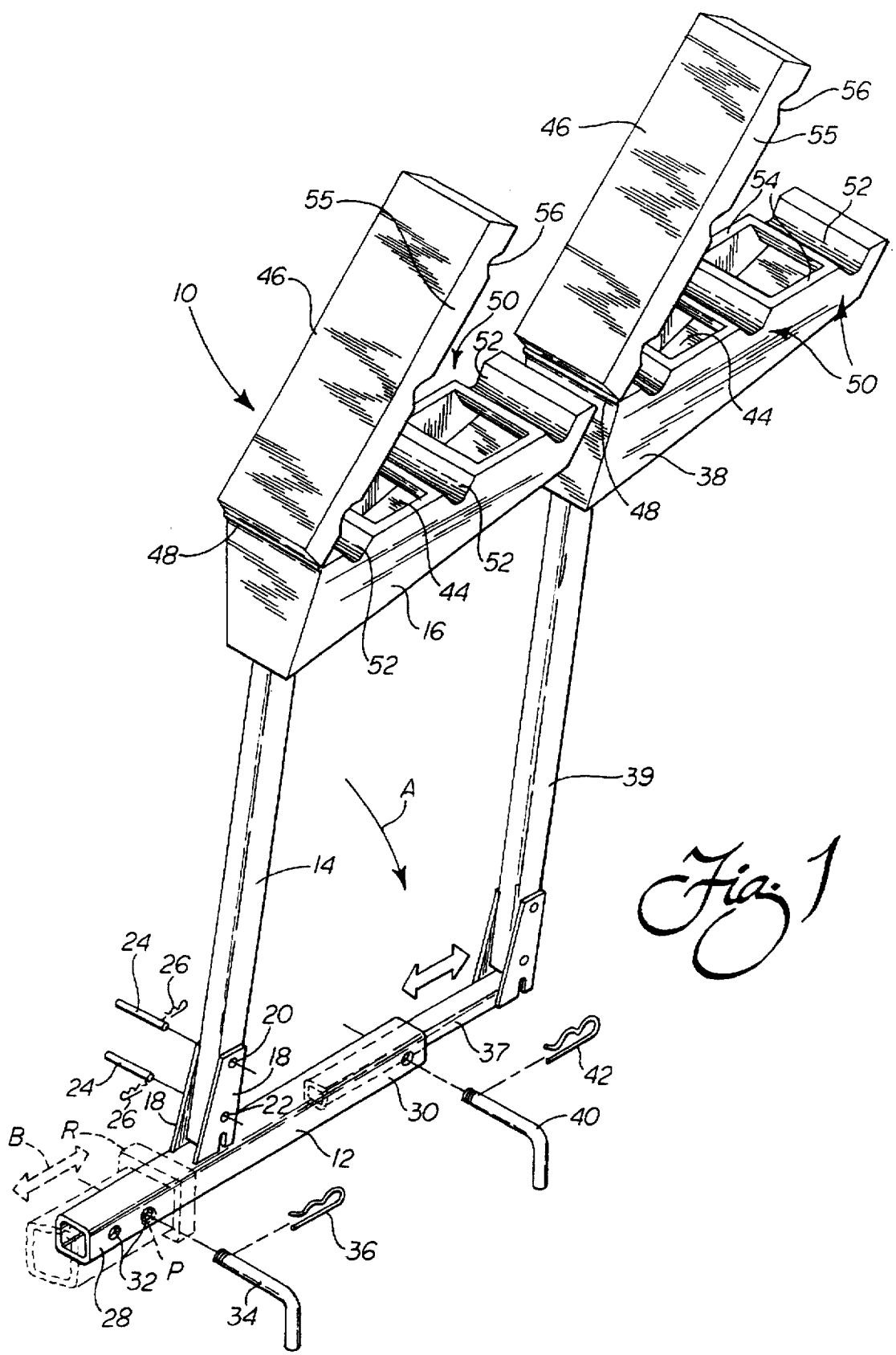
FIG. 1 is a partially exploded perspective view of the vehicle mountable carrier of the present invention.

Reference will now be made in detail to the present preferred embodiment of the invention, an example of which is illustrated in the accompanying drawing.

DETAILED DESCRIPTION OF THE INVENTION

Reference is now made to the drawing figures showing the vehicle mountable carrier 10 of the present invention. As particularly shown in FIG. 1, the carrier 10 comprises a body including a mounting tube 12, a post 14 pivotally connected to the mounting tube 12 at one end and carrying an article holder 16 at the opposite end. More specifically, the post 14 is inserted between two projecting brackets 18 that are welded to the mounting post 12. Each bracket 18 includes first and second aligned apertures 20, 22. The post 14 includes two apertures (not shown) aligned with the apertures 20, 22. A pair of connecting pins 24 pass through the aligned apertures 20, 22 in the brackets 18 and the apertures in the post 14. Pin clips 26 may be utilized as is known in the art to secure the connecting pins 24 in position. Of course, it should be appreciated that clearance is maintained between the bottom end of the post 14 and the mounting tube 12 so that the removal of either connecting pin 24 allows the post 14 to pivot about the remaining connecting pin. Thus, the post may be pivoted downwardly in the direction of action arrow A when desired to allow better access to the trunk or hatch of the towing vehicle when desired.

Figure 2:
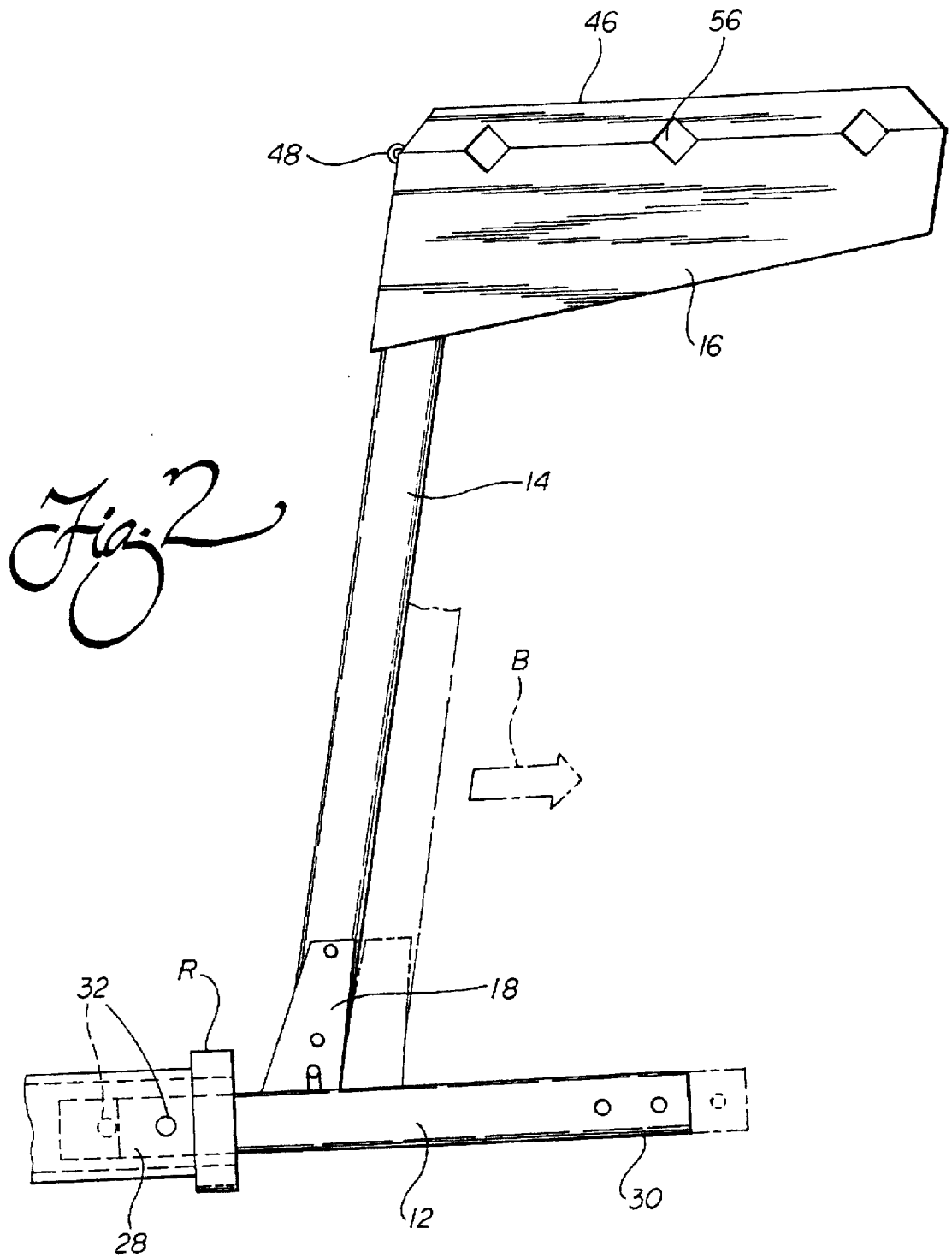
FIG. 2 is a side elevational view of the vehicle mountable carrier shown in FIG. 1 illustrating connection of the carrier to a vehicle hitch receiver.

As is best appreciated from reviewing FIGS. 1 and 2, the mounting tube 12 includes a proximal end that functions as a mount 28 for securing the carrier 10 to a trailer hitch receiver R of a vehicle (not shown) and a distal end that functions as a receiver 30 for receiving a hitch bar. More particularly, the mounting tube 12 is a square tube specifically dimensioned for receipt in a trailer hitch receiver R of a type well known in the art that is secured to a towing vehicle. Such a hitch receiver with a 2.0 inch square receiver box is, for example, a class III or IV hitch receiver such as the 35 and 36 series available from Reese Products, Inc. of Elkhart, Ind. More particularly, the mount 28 is plugged into the receiver R. One of the two sets of apertures 32 is then aligned with like apertures P in the receiver R. Either set of apertures 32 may be utilized with one set providing greater clearance between the post and vehicle than the other (note action arrows B in FIGS. 1 and 2). Once aligned, a connecting pin 34 is inserted through the aligned apertures 32, and a pin clip 36 is used to secure the connecting pin into position. In this way, the carrier 10 is securely mounted to the towing vehicle through the trailer hitch receiver R.

Figure 3:
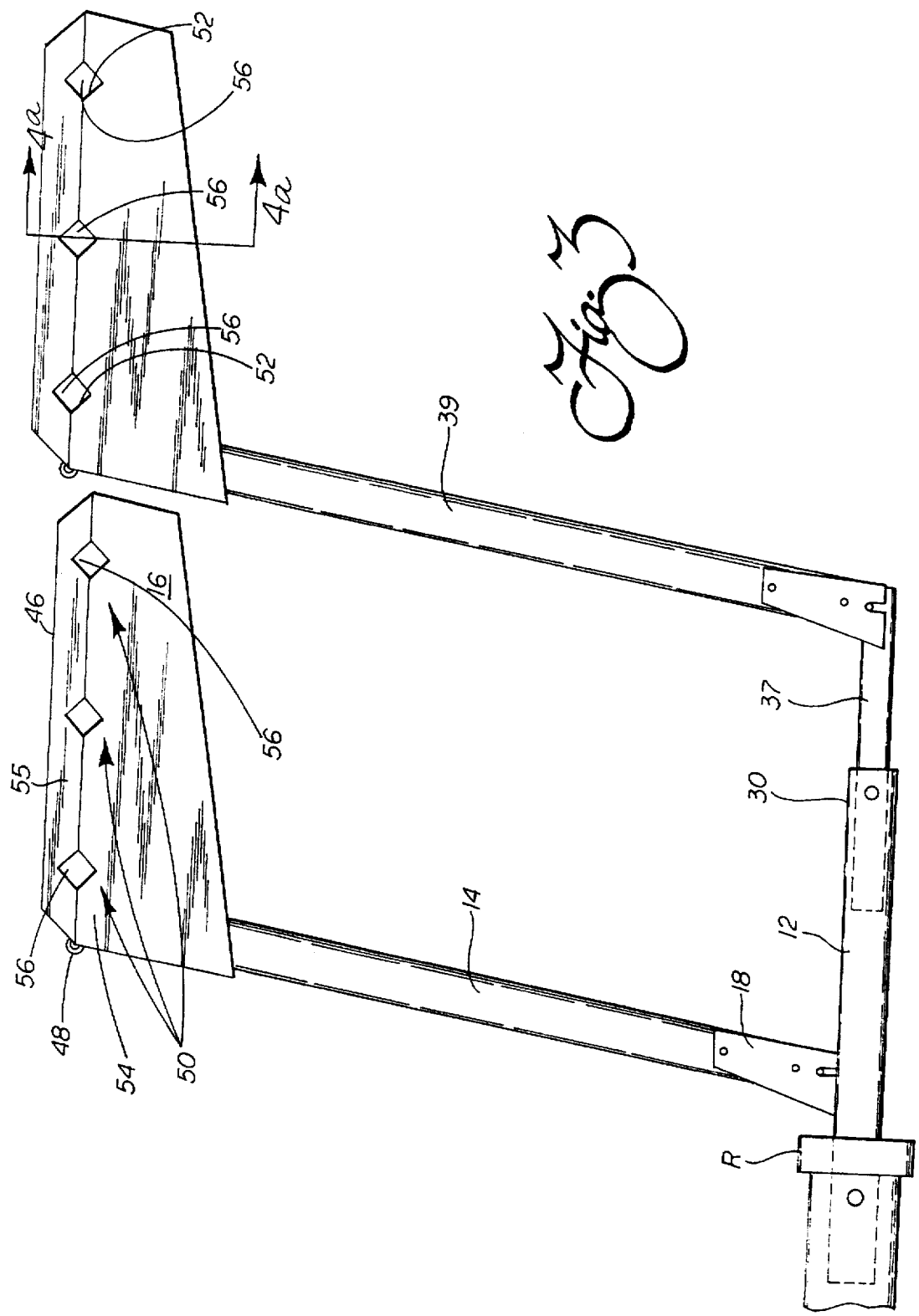
FIG. 3 is a side elevational view similar to FIG. 2 but additionally showing the connection of a second hitch bar with auxiliary carrier connected to the integral receiver of the carrier.

The receiver 30 at the opposite or distal end of the mounting tube 12 functions as a class II receiver (i.e. includes a 1.25 inch square receiver box). Thus, as best shown in FIGS. 1 and 3, a hitch bar 37 may be secured into the receiver 30. The hitch bar 37 may carry an auxiliary article holder 38 with pivotal post 39 so as to allow an individual to expand the capacity of the vehicle mountable carrier 10. Alternatively, the hitch bar 37 may be equipped with a hitch ball (not shown) adapted for connection to a light weight trailer. It should be appreciated, however, that the hitch bar 37 may carry other accessories such as a large cargo box or any other known to those skilled in the art. The connection of the hitch bar 37 to the receiver 30 may be made by connecting pin 40 and pin clip 42 in the same manner previously described with respect to the connection of the mounting tube 12 to the trailer hitch receiver R.

Figure 4A:
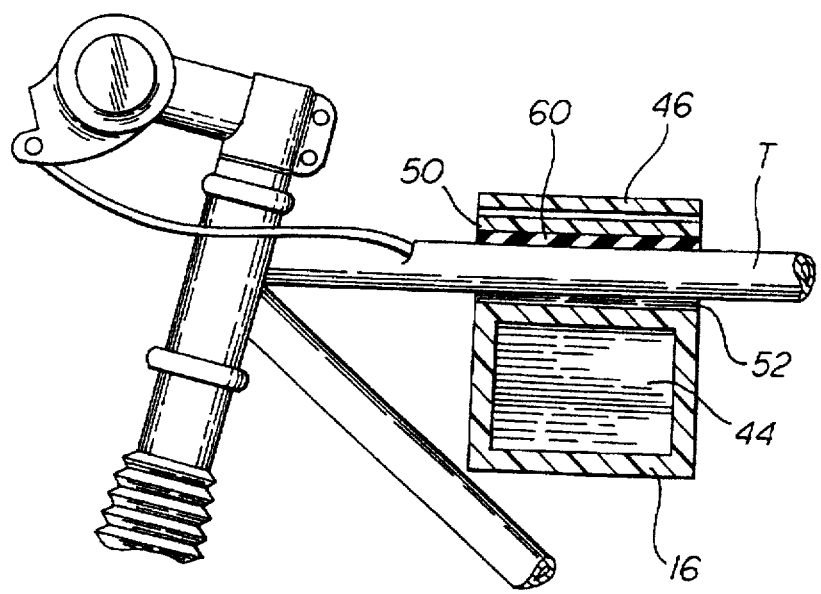
FIGS. 4a and 4b are two detailed, 90° out-of-phase, partially sectional views showing the positioning of the top tube of a bicycle frame in the cradle of the storage compartment with the lid of the storage compartment closed.
Figure 4B:
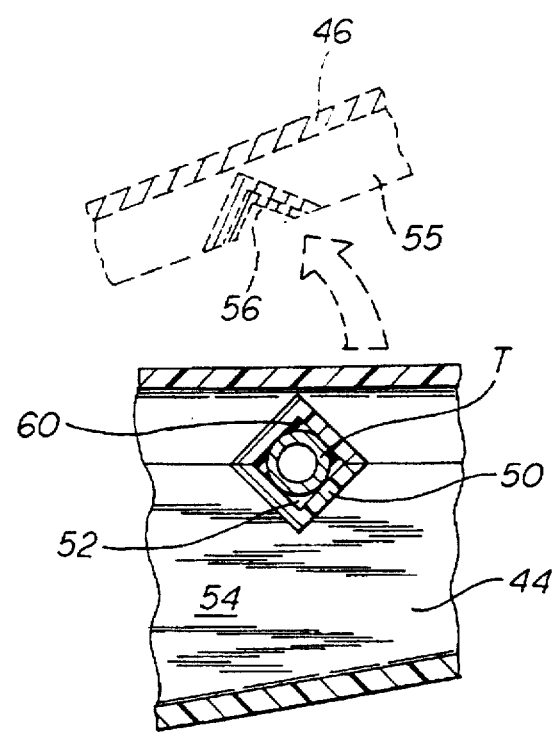

As best shown in FIGS. 1 and 4a and 4b, the article holders 16, 38 comprise a storage compartment 44 and cooperating lid 46. Where the storage compartment 44 and lid 46 are molded from plastic, the connection of the lid and storage compartment may be by means of living hinge 48. Advantageously, the storage compartment 44 and lid 46 cooperate to provide an enclosure for carrying various accessories such as riding gloves, hat, goggles, small tools and other equipment where it is conveniently located and protected from weather and theft.

As should further be appreciated with reference to FIGS. 1 and 4a and 4b, the article holder 16 includes three cradles generally designated by the reference numeral 50. Each cradle 50 is adapted to cradle a frame element of the bicycle. More particularly, each cradle 50 includes a bicycle frame support channel 52 that bridges between the opposing sidewalls 54 of the storage compartment 44. A series of cooperating notches 56 are provided in the opposing sidewalls 55 of the lid 46.

With reference to FIG. 4a and 4b, it should be appreciated that with the lid 46 opened, the bicycle frame receiving channel 52 is exposed. The top tube T of a bicycle frame is then positioned to rest in the channel 52. The lid 46 is then closed with the notches 56 providing the necessary clearance to receive the top tube T while allowing full closure of the lid. A locking mechanism of a type known in the art (not shown) may be provided to latch and secure the lid 46 in the closed position thereby capturing the top tube T of the bicycle frame within the channel 52.

As further shown in FIG. 4a and 4b, the bottom wall of the lid 46 may include resilient pads 60 that compress against the top tube T when the lid 46 is fully closed and locked. Accordingly, vibration between the article carrier 16 and top tube T of the bicycle is absorbed and dampened. This functions to protect the bicycle components from resonance vibrations that might otherwise be produced during towing and cause parts to loosen and/or become damaged over time. Of course, it should be appreciated that an additional bicycle may be suspended by its top tube T in each channel 52 so that a total of three may be simultaneously held in the carrier 10 shown.

In summary, numerous benefits result from employing the concepts of the present invention. First, a vehicle mountable carrier of virtually universal utility is provided. The carrier includes an enclosed storage compartment 44 that can be locked to secure various accessories against theft while protecting them from inclement weather. Further the storage compartment is adapted to receive and hold at least one and preferably three bicycles with the top tube of the frame of the bicycles being securely captured between the hinge lid 46 and sidewalls 54 of the storage compartment 44. Resilient pads 60 provide a snug fit and dampen unwanted vibrations.

Additionally, while the mountable carrier 10 plugs into and fills the vehicle receiver R, it must be appreciated that the carrier also includes an integral receiver 30. This receiver 30 is adapted to receive a hitch bar 37 that may be equipped with an additional bike rack 38 as shown or a cargo box for tools and other supplies or any other accessories which might be of interest to the cyclist or vehicle operator. In fact, the hitch bar 37 may even be equipped with a hitch ball that may be utilized to tow a light weight trailer. Such versatility is heretofore unknown in the art.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A vehicle mountable carrier comprising: a body including an article holder, a mount for securing said body to a vehicle and a receiver for receiving a hitch bar, said article holder comprising a storage compartment having an interior sized to accommodate bicycle riding equipment and a cooperating lid for securably closing said storage compartment, said storage compartment including at least one cradle formed therein for cradling a frame of a bicycle.

2. The vehicle mountable carrier set forth in claim 1, wherein said body includes a post and a mounting tube forming both said mount and said receiver.

3. The vehicle mountable carrier set forth in claim 2, further including means for pivotally connecting said post to said mounting tube.

4. The vehicle mountable carrier set forth in claim 2, wherein said mount further comprises cooperating, aligned securing apertures in sidewalls of said mounting tube, a connecting pin operatively received in said securing apertures and a pin clip for retaining said connecting pin in said securing apertures.

5. The vehicle mountable carrier set forth in claim 4, wherein multiple rows of cooperating aligned securing apertures are provided in said mount to furnish adjustability.

6. The vehicle mountable carrier set forth in claim 4, wherein said receiver includes cooperating, aligned mounting apertures in sidewalls of said receiver, a second connecting pin operatively received in said mounting apertures and a second pin clip for retaining said second connecting pin in said mounting apertures.

7. The vehicle mountable carrier set forth in claim 1, wherein said storage compartment and lid are interconnected by means of a living hinge.

8. The vehicle mountable carrier set forth in claim 1, wherein said cradle includes a bicycle frame support channel bridging said storage compartment and cooperating aligned frame receiving notches in said lid.

* * * * *